(12) United States Patent
Frosti

(10) Patent No.: US 7,806,960 B2
(45) Date of Patent: Oct. 5, 2010

(54) FLUID TREATMENT DEVICE

(76) Inventor: Raymond Leroy Frosti, 3 Windswept Ridge Rd., Ivoryton, CT (US) 06442

( * ) Notice: Subject to any disclaimer, the term of this patent is extended or adjusted under 35 U.S.C. 154(b) by 568 days.

(21) Appl. No.: 11/800,855

(22) Filed: May 7, 2007

(65) Prior Publication Data

US 2008/0277353 A1    Nov. 13, 2008

(51) Int. Cl.
*B01D 19/00* (2006.01)
(52) U.S. Cl. .............. 95/24; 95/258; 95/263; 96/202; 261/36.1; 261/76; 261/DIG. 75; 210/218; 210/220
(58) Field of Classification Search ............ 95/258, 95/263, 24, 264, 265; 96/202; 261/36.1, 261/76, DIG. 75; 210/218, 220
See application file for complete search history.

(56) References Cited

U.S. PATENT DOCUMENTS

| | | | |
|---|---|---|---|
| 4,444,259 A | 4/1984 | Schwall | |
| 5,354,459 A | 10/1994 | Smith | |
| 5,555,934 A | 9/1996 | Haufler | |
| 5,614,086 A | 3/1997 | Hill | |
| 5,618,417 A | 4/1997 | Spindler | |
| 5,766,457 A | 6/1998 | Spindler | |
| 5,858,071 A * | 1/1999 | Nilsson | 96/170 |
| 5,951,921 A * | 9/1999 | Koganezawa et al. | 261/36.1 |
| 6,209,856 B1 * | 4/2001 | Kojima | 261/36.1 |
| 6,287,369 B1 * | 9/2001 | Osmond | 96/202 |
| 6,372,024 B1 * | 4/2002 | Prescott et al. | 95/263 |
| 6,719,911 B2 | 8/2003 | Bourke | |
| 7,048,861 B2 | 6/2005 | Beretta, III | |
| 2006/0037918 A1 | 2/2006 | Spani | |
| 2008/0302737 A1 * | 12/2008 | Denkewicz et al. | 210/760 |

* cited by examiner

*Primary Examiner*—Frank M Lawrence
*Assistant Examiner*—Douglas J Theisen
(74) *Attorney, Agent, or Firm*—Steven M. McHugh

(57) ABSTRACT

A method and apparatus for treating a fluid is provided and includes a fluid storage tank for partially containing a fluid and a gas, wherein the fluid storage tank includes a fluid inlet pipe and a fluid outlet pipe. The fluid treatment apparatus also includes a first aeration device, wherein the first aeration device is configured to be in flow communication with the fluid inlet pipe and the fluid portion of the tank cavity. The fluid treatment apparatus further includes a pumping device, wherein the pumping device is configured to cause the fluid portion of the tank cavity to flow through the fluid outlet pipe and a second aeration device, wherein the second aeration device is configured to be in flow communication with the fluid outlet pipe and the fluid portion of the tank cavity.

20 Claims, 4 Drawing Sheets

US 7,806,960 B2

FLUID TREATMENT DEVICE

FIELD OF THE INVENTION

This disclosure relates generally to fluid treatment systems and more particularly to a fluid treatment system and method for removing contaminants from fluids.

BACKGROUND OF THE INVENTION

In fluids that are recovered from ground reservoirs, such as from residential or commercial wells, the fluids may contain objectionable impurities, such as radon or Volatile Organic Chemicals (VOC's). Radon, which is a colorless, odorless, radioactive gas produced from the natural decay of uranium, is naturally emitted from the ground or found in well water. Outdoors, radon is naturally diluted and is not typically thought of as a health hazard, whereas when trapped in a closed environment or in water (or some other fluid) in sufficiently high concentrations, it is considered to be deleterious to health. In fact, several epidemiological studies have identified radon as a potent carcinogen that causes lung cancer in human beings. It has been estimated that between 500 to 1500 lung cancer deaths annually are due to radon contamination of residential potable water supplies. Moreover, the risk from water contaminated with radon is actually considered to be higher than the combined risk from all of the other man-made chemical contaminants that may be found in residential drinking water.

In order to solve this problem, systems have been developed to remove these impurities and unfortunately these radon removal systems are typically complicated and relatively expensive to install and maintain. There are currently three (3) known methods for treating fluids contaminated with radon gas to remove the gas; decay storage, Granular Activated Carbon (GAC) filtration and spray aeration. Decay storage simply involves storing water in a large water tank for a period of time to allow the radon contained therein to naturally dissipate. This is possible because radon has a radiological half life of only 3.785 days and as such, allowing the water to sit for a period of time, such as a month, greatly reduces the amount of radon contained in the water by approximately 99.5%. Unfortunately however, decay storage requires a large tank which includes a device to maintain essentially plug flow conditions to prevent back mixing. Additionally, although GAC filtration systems are somewhat effective, radioactivity can build up in the adsorbent filter bed. This adsorbent filter bed gives off radioactivity in the form of gamma rays (primarily) as the radon decays and may itself present a health hazard. Another disadvantage to GAC filtration systems involves the disposal of the radioactive GAC filter when it becomes contaminated with other water borne impurities, such as iron, sediment and/or bacteria.

Aeration systems, on the other hand, are also effective, but they do not accumulate radioactivity. The aeration method involves introducing air into the water supply to increase the gas-liquid interface, thereby allowing the radon gas contained in the water to diffuse into an air/radon gas mixture which is then vented from the water supply into the outside atmosphere. Unfortunately, although current aeration system configurations allow for the removal of a limited amount of radon from the water, they tend to include a pump to achieve the aeration effect. Thus, they tend to be very noisy and increase electricity consumption.

SUMMARY OF THE INVENTION

A fluid treatment apparatus is provided and includes a fluid storage tank defining a tank cavity for partially containing a fluid portion and a gas portion, wherein the fluid storage tank includes a fluid inlet pipe and a fluid outlet pipe. The fluid treatment apparatus also includes a first aeration device, wherein the first aeration device is configured to be in flow communication with the fluid inlet pipe and the fluid portion of the tank cavity. The fluid treatment apparatus further includes a pumping device, wherein the pumping device is configured to cause the fluid portion of the tank cavity to flow through the fluid outlet pipe and a second aeration device, wherein the second aeration device is configured to be in flow communication with the fluid outlet pipe and the fluid portion of the tank cavity.

A method for removing impurities contained within a fluid is provided, wherein the method includes receiving a fluid to be treated into a storage tank partially containing a gas and a fluid, aerating the fluid via a first aeration device to generate an aerated fluid, dispersing the aerated fluid into the fluid within the storage tank, operating a pumping device to cause the fluid to flow into a second aeration device to generate additional aerated fluid and dispersing the additional aerated fluid into the fluid within the storage tank.

BRIEF DESCRIPTION OF THE DRAWINGS

The foregoing and other features and advantages of the present invention should be more fully understood from the following detailed description of illustrative embodiments taken in conjunction with the accompanying Figures in which like elements are numbered alike in the several Figures.

DETAILED DESCRIPTION

Figure 1:
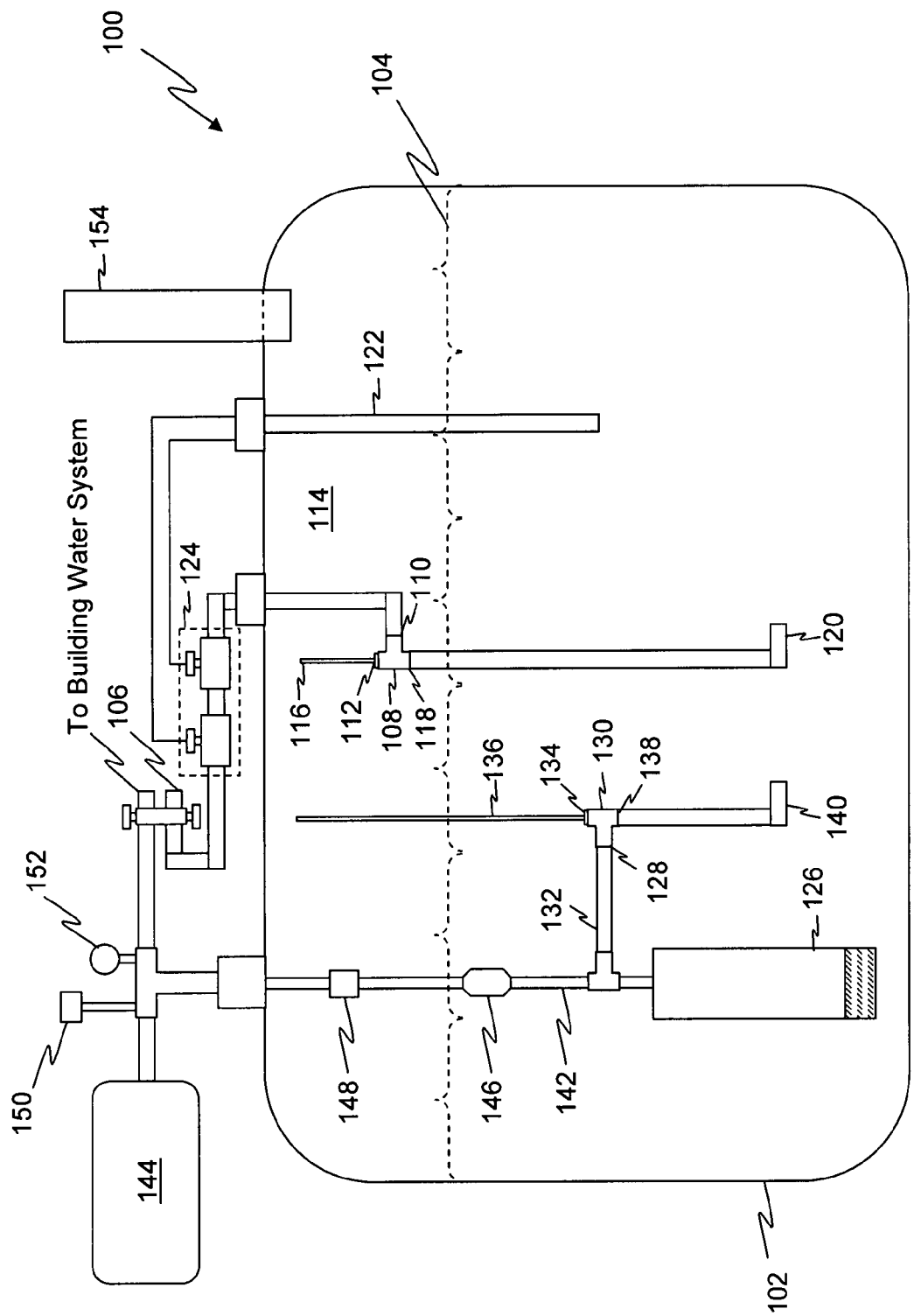
FIG. 1 is a schematic block diagram illustrating a first embodiment of a fluid treatment system, in accordance with the present invention.

Referring to FIG. 1, a fluid treatment system 100 is shown in accordance with a first embodiment of the present invention. Fluid treatment system 100 includes a system tank 102 for containing a fluid 104, wherein the system tank 102 is in flow communication with a fluid source via a fluid inlet pipe 106. The fluid inlet pipe 106 is in flow communication with a first aeration device 108 via a first aeration device fluid inlet 110, wherein the first aeration device 108 also includes a first aeration device air inlet 112 which is exposed to the air 114 within the system tank 102 via a first aeration inlet tube 116. The first aeration device 108 also includes an aeration device outlet 118 which is exposed to the fluid 104 within the system 102 via a first aeration outlet tube 120. It should be appreciated that the fluid treatment system 100 may include a fluid level monitoring device 122 communicated with at least one flow control device 124 associated with the fluid inlet pipe 106 for controlling the flow of fluid 104 into the system tank 102 responsive to the level of the fluid 104 within the system tank 102.

The fluid treatment system 100 further includes a pumping device 126, such as a submersible pump, which is disposed within the fluid 104 within the system tank 102. The pumping device 126 is in flow communication with a second aeration device fluid inlet 128 of a second aeration device 130 via a second aeration device inlet pipe 132. The second aeration device 130 includes a second aeration device air inlet 134 which is exposed to the air 114 within the system tank 102 via a second aeration inlet tube 136. The second aeration device 130 also includes an aeration device outlet 138 which is exposed to the fluid 104 within the system 102 via a second aeration outlet tube 140. Moreover, the submersible pumping device 126 is also in flow communication with a fluid destination via a fluid outlet pipe 142, wherein the fluid destination may be a fluid storage tank 144 or a building water system.

It should be appreciated that the fluid treatment system 100 may also include a cycle stop 146, a check valve 148, a pressure switch 150 and/or a pressure gauge 152 associated with the fluid outlet pipe 142 to allow for monitoring and control of the fluid 104 being output by the fluid treatment system 100. Furthermore, the fluid treatment system 100 may also include a ventilation device 154 for venting the air 114 contained within the system tank 102 into the atmosphere. This allows the air 114 (and impurities contained therein) within the system tank 102 to be refreshed on a constant and/or periodic basis by releasing any impurities into the atmosphere. It should be appreciated that although the first aeration device 108 and the second aeration device 130 are venturi type devices that achieve aeration via the venturi effect, any type of aeration device suitable to the desired end purpose may be used.

Figure 2:
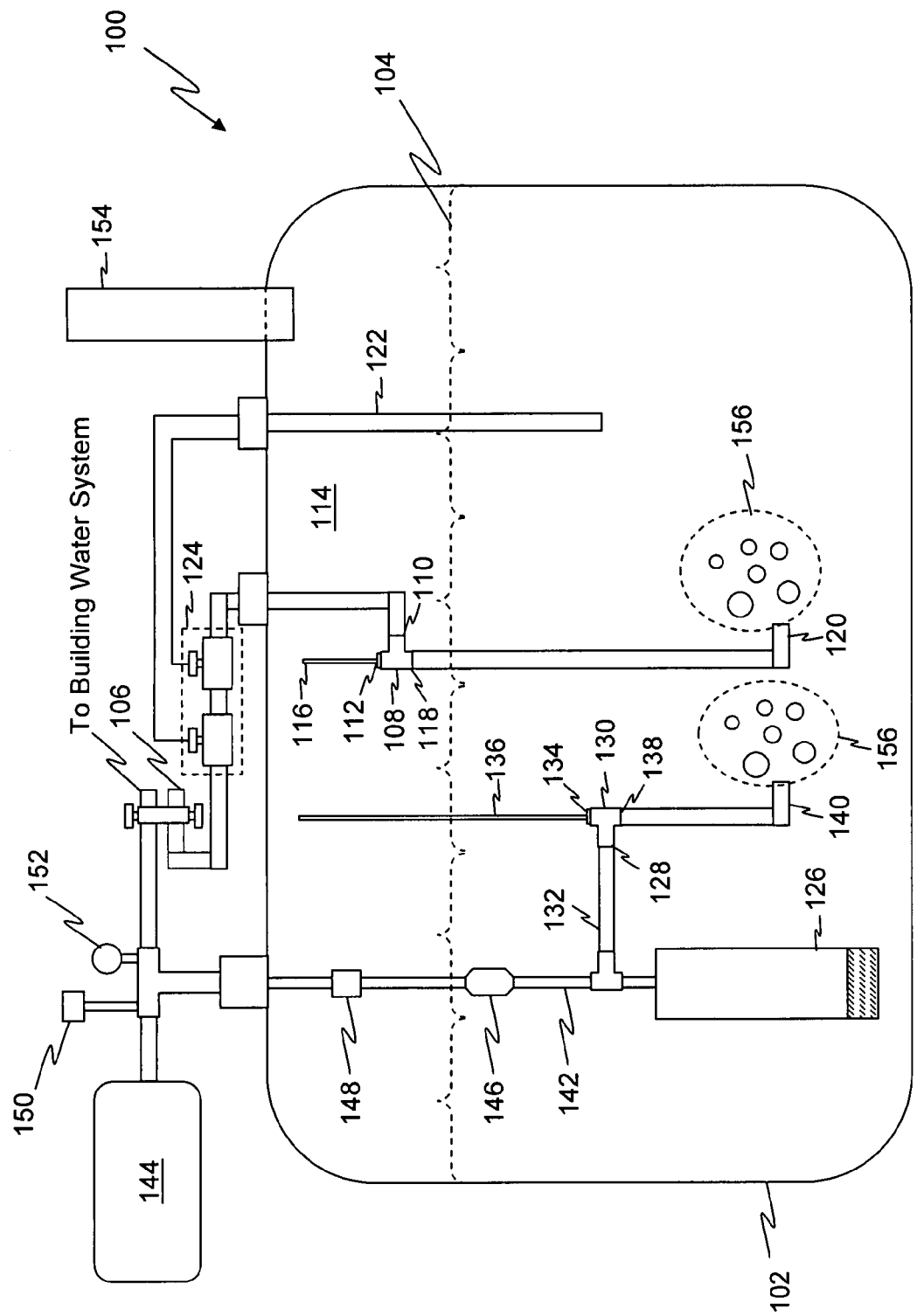
FIG. 2 is a schematic block diagram illustrating the fluid treatment system, FIG. 1.

In accordance with the present invention and referring to FIG. 2, the fluid treatment system 100 operates as follows and is explained herein as being applied to an in-home water system. Feed water, such as that from a well system, is introduced into the fluid treatment system 100 via the fluid inlet pipe 106. As the fluid is introduced into the system tank 102 via the fluid inlet pipe 106, the fluid level monitoring device 122 monitors the level of the fluid within the system tank 102. It should be appreciated that if the level of the fluid 104 within the system tank 102 reaches a predetermined level, the at least one flow control device 124 terminates or partially restricts the flow of fluid 104 into the system tank 102. As the fluid 104 enters the first aeration device 108 via the first aeration device fluid inlet 110, air 114 is drawn into the first aeration device 108 via the first aeration inlet tube 116. As the fluid 104 and air 114 pass through the first aeration device 108, aeration of the fluid 104 occurs via the venturi effect and the aerated fluid 156 is dispensed back into the fluid 104 contained within the system tank 102. This aerated fluid 156 contains a portion of radon gas which floats to the top of the fluid 104 and is combined with the air 114. The mixture of air 114 and radon gas may be allowed to vent into the atmosphere via the ventilation device 154 or may be forced out via a fan.

Additionally, as fluid 104 is delivered to the building water system, the pumping device 126 is operated to draw the fluid 104 into the pumping device 126 and through the fluid outlet pipe 142 where a portion of the fluid 104 is directed to flow into the building water system and a portion of the fluid is directed to flow into the second aeration device fluid inlet 128 via the second aeration device inlet pipe 132. As the fluid 104 enters the second aeration device 130 via the second aeration device fluid inlet 128, air 114 is drawn into the second aeration device 130 via the second aeration inlet tube 136. As the fluid 104 and air 114 pass through the second aeration device 130, aeration of the fluid 104 occurs via the venturi effect and the aerated fluid 156 is dispensed back into the fluid 104 contained within the system tank 102. As before, this aerated fluid 156 contains a portion of radon gas which floats to the top of the fluid 104 and is combined with the air 114. The mixture of air 114 and radon gas may be allowed to vent into the atmosphere via the ventilation device 154 or may be forced out via a fan.

It should be appreciated that as the fluid 104 is flowing through the fluid outlet pipe 142 to the building water system, the flow of the fluid 104 through the fluid outlet pipe 142 may be controlled via the cycle stop 146 and the check valve 148, wherein the cycle stop 146 may regulate the flow of the fluid 104 and the check valve 148 may allow the fluid 104 to flow in only one direction to prevent back mixing.

Figure 3:
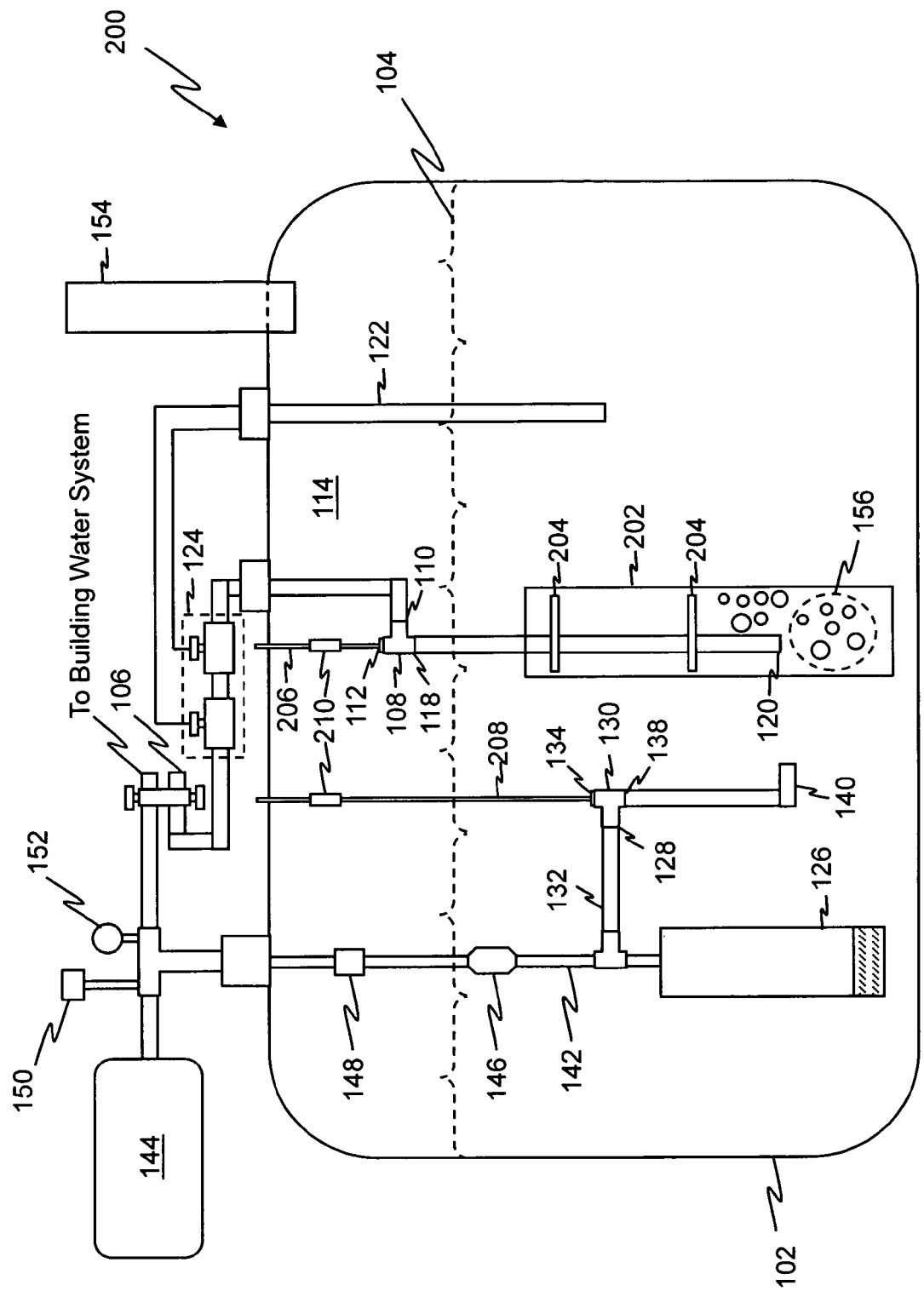
FIG. 3 is a schematic block diagram illustrating a second embodiment of a fluid treatment system, in accordance with the present invention.

Referring to FIG. 3, a second embodiment of a fluid treatment system 200 is shown and is arranged in a similar fashion as the first embodiment of the fluid treatment system 100 as shown in FIG. 1. However, the fluid treatment system 200 also includes a bubble tower 202 disposed to at least partially cover and/or contain first aeration outlet tube 120 such that when the aerated fluid 156 is dispensed from the first aeration outlet tube 120, the aerated fluid 156 travels up the bubble tower to the surface of the fluid 104. Furthermore, the fluid treatment system 200 may also include a baffle plate 204 disposed within the bubble tower 202 to prevent the aerated fluid from rising to the surface of the fluid 104 too fast. It should be appreciated that one or a plurality of baffle plates 204 may be used. Additionally, the fluid treatment system 200 also includes a first aeration inlet tube 206 and a second aeration inlet tube 208 that is exposed to the air outside of the system tank 102. The first aeration inlet tube 206 and/or the second aeration inlet tube 208 may include check valves 210 that only allows outside air to flow into the first aeration inlet tube 206 and second aeration inlet tube 208 and that prevents fluid 104 from flowing outside the tank via the first aeration inlet tube 206 and the second aeration inlet tube 208. In accordance with the present invention, the bubble tower 202 may have one or more openings to allow the aerated fluid 156 to be dispersed with the fluid 104. These openings may be located at the bottom of the bubble tower 202 or they may be disposed along the structure of the bubble tower 202 as desired. Additionally, it is contemplated that the bubble tower 202 may have no openings disposed at the bottom or along the structure and as such, the aerated fluid 156 may be dispersed into the fluid 104 via an opening in the top portion of the bubble tower 202 or via an additional ventilation tube into the outside atmosphere.

Figure 4:
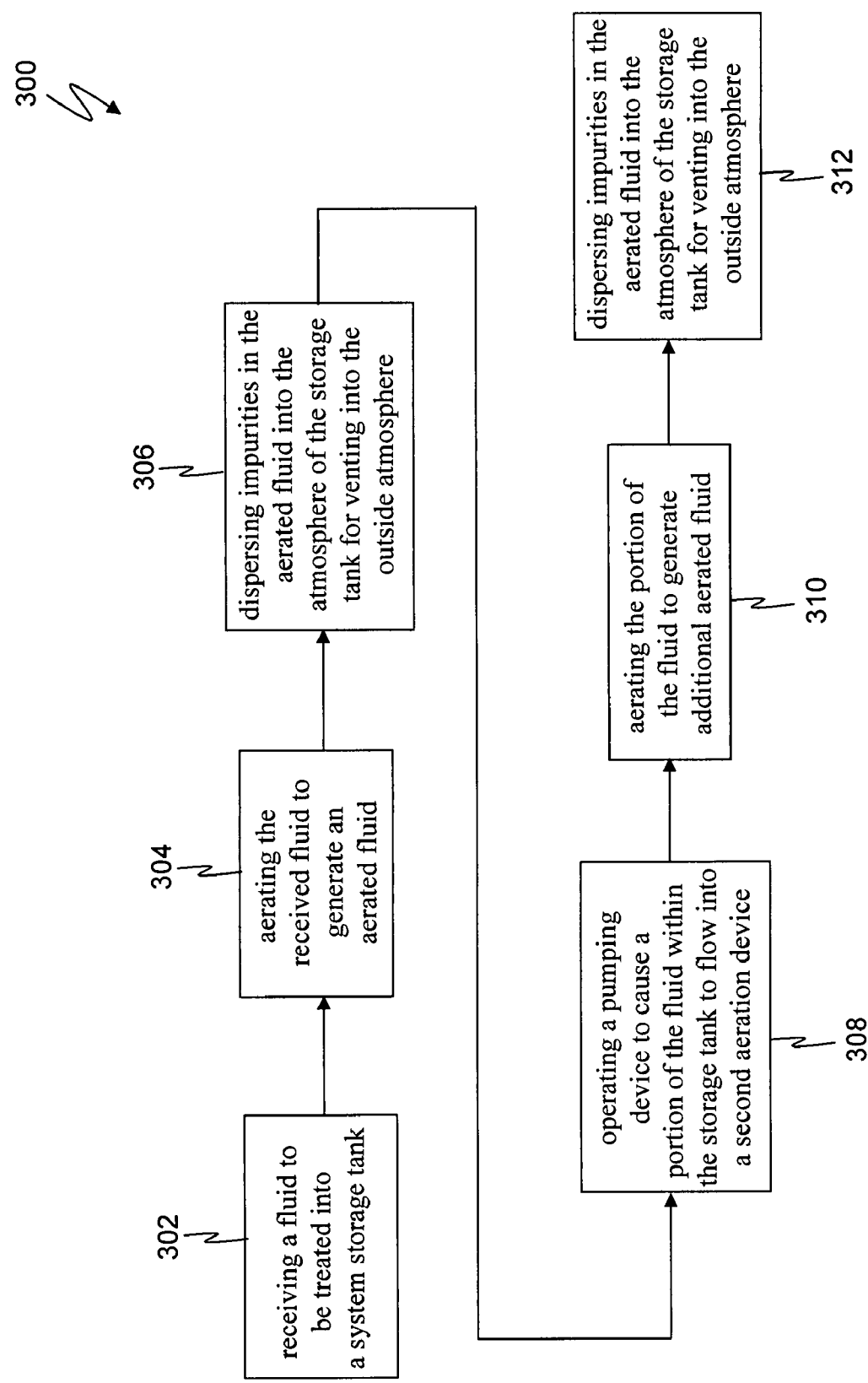
FIG. 4 is a block diagram illustrating one embodiment of a method for removing radon from a fluid using the fluid treatment system of FIG. 1 and/or FIG. 3, in accordance with the present invention.

Referring to FIG. 4, a block diagram illustrating a method 300 for treating a fluid to remove impurities contained within the fluid is shown and includes receiving a fluid to be treated into a system storage tank to partially fill the system storage tank, as shown in operational block 302. The received fluid is then aerated via a first aeration device to generate an aerated fluid, as shown in operational block 304. The aerated fluid is then dispersed into the fluid contained in the system storage tank and allowed to float to the surface to allow impurities, such as radon gas, to be dispersed into the atmosphere of the system storage tank for venting into the outside atmosphere, as shown in operational block 306. The method 300 further includes operating a pumping device to cause some of the fluid contained within the system storage tank to flow into a second aeration device, as shown in operational block 308, which aerates the fluid to generate additional aerated fluid, as shown in operational block 310. This additional aerated fluid is then dispersed into the fluid contained in the system storage tank and allowed to float to the surface to allow impurities, such as radon gas, to be dispersed into the atmosphere of the system storage tank for venting into the outside atmosphere, as shown in operational block 312.

It should be appreciated that the fluid treatment system 100, 200 may include more or less aeration devices. Additionally, it is contemplated that the fluid treatment system 100, 200 may include aeration devices disposed in a series fashion. It should be further appreciated that although first aeration device 108 and/or second aeration device 130 are disclosed herein as being a venturi type of aeration device, first aeration device 108 and/or second aeration device 130 may be any type of aeration device suitable to the desired end purpose. Furthermore, although the gas portion of the system tank 102 is disclosed herein in terms of a ventilation device 154, evacuation devices, such as fans, may be used to vent the gas portion of the system tank 102 as desired.

While the invention has been described with reference to an exemplary embodiment, it should be understood by those skilled in the art that various changes may be made and equivalents may be substituted for elements thereof without departing from the scope of the invention. In addition, many modifications may be made to adapt a particular situation or material to the teachings of the invention without departing from the scope thereof. Therefore, it is intended that the invention not be limited to the particular embodiment disclosed as the best mode contemplated for carrying out this invention, but that the invention will include all embodiments falling within the scope of the appended claims. Furthermore, unless specifically stated any use of the terms first, second, etc. do not denote any order or importance, but rather the terms first, second, etc. are used to distinguish one element from another.

What is claimed is:

1. A fluid treatment apparatus, comprising:
   a system tank defining a tank cavity for partially containing a fluid portion and a gas portion, wherein said system tank includes a fluid inlet pipe and a fluid outlet pipe;
   a first aeration device, wherein said first aeration device is configured to be in flow communication with said fluid inlet pipe and said fluid portion of said tank cavity;
   a pumping device, wherein said pumping device is configured to cause said fluid portion of said tank cavity to flow through said fluid outlet pipe; and
   a second aeration device, wherein said second aeration device is configured to be in flow communication with said fluid outlet pipe and said fluid portion of said tank cavity, wherein at least one of said first aeration device and said second aeration device uses a venturi effect to aerate said fluid.

2. The apparatus of claim 1, wherein said first aeration device is a venturi aeration device.

3. The apparatus of claim 1, wherein said second aeration device is a venturi aeration device.

4. The apparatus of claim 1, wherein at least a portion of said gas portion of said tank cavity includes air.

5. The apparatus of claim 1, wherein said fluid portion of said tank cavity includes well water.

6. The apparatus of claim 1, further comprising a fluid level monitoring device for monitoring the level of said fluid within said tank cavity.

7. The apparatus of claim 1, further comprising a fluid level monitoring device for monitoring the level of gas within said gas portion of said tank cavity.

8. The apparatus of claim 6, further comprising a fluid flow regulating device associated with said fluid inlet pipe and communicated with said fluid level monitoring device, wherein said fluid flow regulating device is configured to adjust the flow of said fluid through said fluid inlet pipe responsive to said fluid level monitoring device.

9. The apparatus of claim 1, wherein said first aeration device and/or said second aeration device are in flow communication with said gas portion of said tank cavity via an aeration inlet tube.

10. The apparatus of claim 1, further comprising at least one flow directional control device configured to allow gas to flow into said first aeration device and said second aeration device, wherein said first aeration device and/or said second aeration device are in flow communication with the outside atmosphere via an aeration inlet tube.

11. The apparatus of claim 1, further comprising a flow regulator device associated with said fluid outlet pipe to control the flow of fluid through said fluid outlet pipe.

12. The apparatus of claim 1, further comprising a flow directional control device associated with said fluid outlet pipe to allow fluid flowing through said fluid outlet pipe to flow in only one direction.

13. The apparatus of claim 1, further comprising a bubble tower, said bubble tower being disposed to be at least partially submerged within said fluid contained within said tank cavity, wherein said bubble tower is configured to at least partially cover a first aeration outlet tube.

14. The apparatus of claim 1, further comprising a ventilation device for venting said gas portion of said tank cavity into the outside atmosphere.

15. A method for removing impurities contained within a fluid, the method comprising:
   receiving a fluid to be treated into a system tank partially containing a gas and said fluid;
   aerating said fluid via a first aeration device to generate an aerated fluid, said first aeration device using a venturi effect to aerate said fluid;
   dispersing said aerated fluid into said fluid within said system tank
   operating a pumping device to cause said fluid to flow into a second aeration device to generate additional aerated fluid; and
   dispersing said additional aerated fluid into said fluid within said system tank.

16. The method of claim 15, further comprising venting said gas into the outside atmosphere.

17. The method of claim 15, wherein said aerating includes aerating said fluid via a venturi aeration device.

18. The method of claim 15, wherein said aerating includes aerating said fluid via said second aeration device, wherein said second aeration device is a venturi aeration device.

19. The method of claim 15, further comprising regulating said flow of said fluid responsive to the level of said fluid within said tank cavity.

20. The method of claim 15, further comprising controlling the direction of said flow to ensure that the fluid flows in only one direction.

* * * * *